United States Patent
Ukita et al.

(10) Patent No.: US 8,120,677 B2
(45) Date of Patent: Feb. 21, 2012

(54) IMAGING APPARATUS, ADJUSTMENT METHOD OF BLACK LEVEL, AND PROGRAM

(75) Inventors: Shinji Ukita, Hyogo (JP); Mitsuaki Kita, Kanagawa (JP)

(73) Assignee: Sony Corporation, Tokyo (JP)

( * ) Notice: Subject to any disclaimer, the term of this patent is extended or adjusted under 35 U.S.C. 154(b) by 352 days.

(21) Appl. No.: 12/533,615

(22) Filed: Jul. 31, 2009

(65) Prior Publication Data

US 2010/0060768 A1    Mar. 11, 2010

(30) Foreign Application Priority Data

Sep. 8, 2008 (JP) .................................. 2008-230302

(51) Int. Cl.
*H04N 5/217* (2011.01)
(52) U.S. Cl. ...................................................... 348/241
(58) Field of Classification Search .................. 348/241
See application file for complete search history.

(56) References Cited

U.S. PATENT DOCUMENTS

| | | | |
|---|---|---|---|
| 7,609,304 B2 * | 10/2009 | Kobayashi et al. | 348/241 |
| 7,750,955 B2 * | 7/2010 | Shirai et al. | 348/243 |
| 7,760,258 B2 * | 7/2010 | Huang et al. | 348/294 |
| 2005/0083419 A1 * | 4/2005 | Honda et al. | 348/244 |
| 2006/0132625 A1 * | 6/2006 | Mori | 348/241 |
| 2007/0290245 A1 * | 12/2007 | Unagami et al. | 257/294 |
| 2009/0091641 A1 * | 4/2009 | Hattori | 348/241 |
| 2009/0278962 A1 * | 11/2009 | Richardson et al. | 348/241 |
| 2010/0302415 A1 * | 12/2010 | Egawa | 348/243 |

FOREIGN PATENT DOCUMENTS

| | | |
|---|---|---|
| JP | 2000-152098 | 5/2000 |
| JP | 2002-64196 | 2/2002 |
| JP | 2004-88306 | 3/2004 |

OTHER PUBLICATIONS

U.S. Appl. No. 12/664,412, filed Dec. 14, 2009, Kita, et al.

* cited by examiner

*Primary Examiner* — James Hannett
(74) *Attorney, Agent, or Firm* — Oblon, Spivak, McClelland, Maier & Neustadt, L.L.P.

(57) ABSTRACT

An imaging apparatus according to the present invention is arranged with an OB level difference correcting unit for performing a process by sectionalizing a vertical pre-stage OB unit to a first region positioned on a side opposite to an effective pixel unit along a vertical transfer direction and a second region positioned on the effective pixel unit side and read out after the first region, and calculating a correction amount for correcting the OB level difference using a signal corresponding to a dark current obtained from the first region, and a correction table described with a relationship of a signal corresponding to the dark current generated in the vertical pre-stage OB unit and an OB level difference which is a difference between a black level in the vertical pre-stage OB unit and a black level of an image signal.

6 Claims, 12 Drawing Sheets

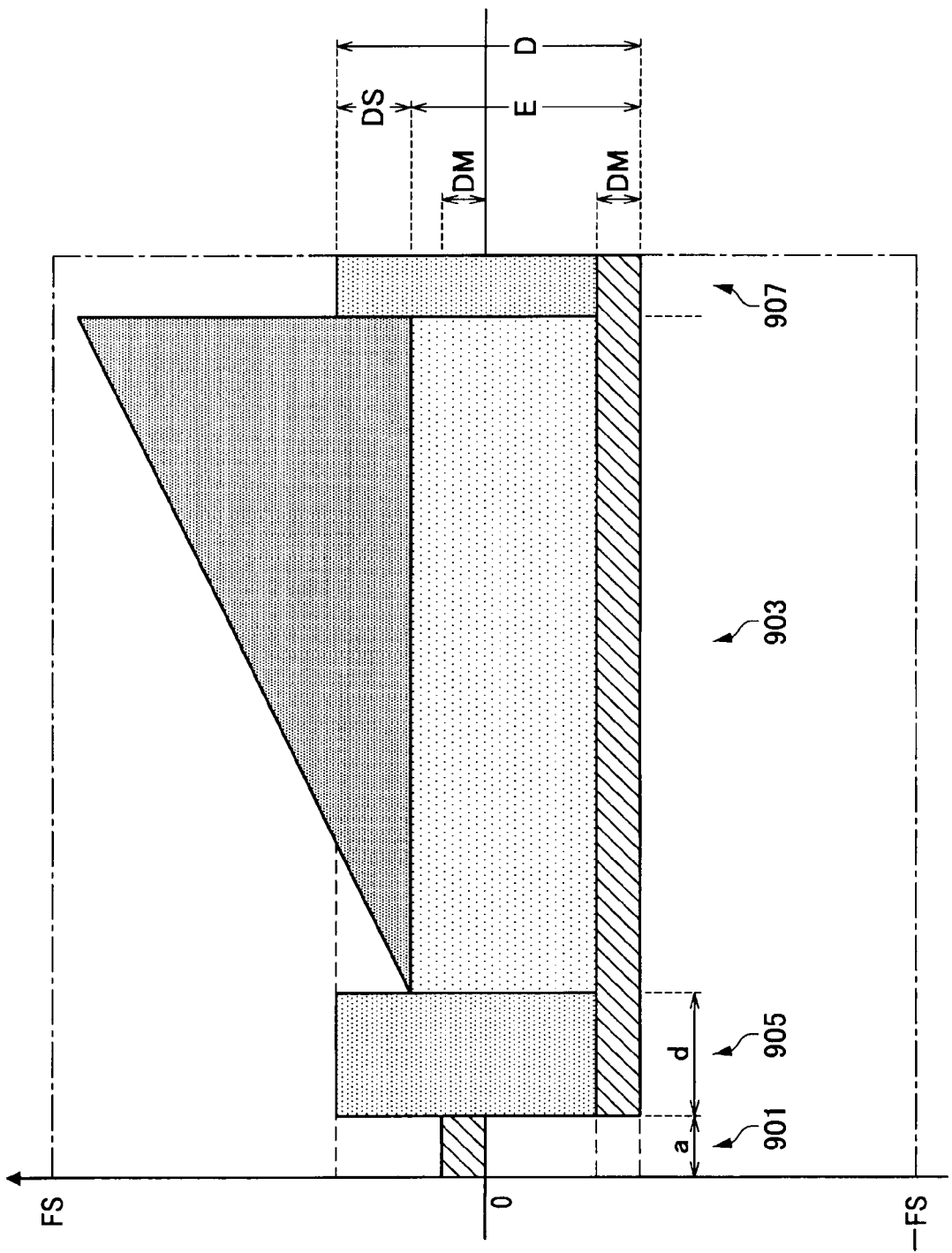

IMAGING APPARATUS, ADJUSTMENT METHOD OF BLACK LEVEL, AND PROGRAM

BACKGROUND OF THE INVENTION

1. Field of the Invention

The present invention relates to an imaging apparatus, an adjustment method of black level, and a program.

2. Description of the Related Art

In recent years, CCD (Charge Coupled Devices), CMOS (Complementary Metal Oxide Semiconductor), and the like have been heavily used as an imaging element of a digital still camera and a digital video camera. In such imaging elements, change in black level referred to as optical black level difference (hereinafter also referred to as OB level difference) is known to occur due to factors such as long-time exposure, gain up, and temperature rise.

In order to correct such OB level difference and realize an appropriate black level, Japanese Patent Application Laid-Open No. 2000-152098 proposes a method of detecting the OB level difference after AD (Analog to Digital) converting an image signal of after clamping.

SUMMARY OF THE INVENTION

In the method described in Japanese Patent Application Laid-Open No. 2000-152098, a negative component generates at an output value due to the clamping process. However, the AD converter arranged in a normal camera processes only the portion having a positive component when a signal having the negative component is input, and thus the magnitude of the dark current may not be accurately grasped.

In order to solve such issue, consideration is made in performing AD conversion on not only the positive component but also on the negative component. In this case, however, the bit length of the AD conversion circuit and the detection circuit becomes long by one bit, and thus a new issue in that the circuit doubles arises.

A method of not performing the clamping process is also considered so that the signal having negative component does not generate. However, loss of dynamic range occurs as the frequency the image signal exceeds a maximum output value becomes large.

The present invention addresses the above-identified, and other issues associated with conventional methods and apparatuses, and it is desirable to provide a new and improved imaging apparatus capable of accurately correcting the optical black level difference that occurs in the imaging element without involving further addition of sensor and the like and increase of circuit scale, an adjustment method of the black level, and a program.

According to an embodiment of the present invention, there is provided an imaging apparatus including: an imaging element including, an effective pixel unit for converting a light entered to a pixel to a signal charge and outputting as an effective pixel signal, and a vertical pre-stage optical black unit arranged at a pre-stage of the effective pixel unit along a vertical transfer direction, a signal obtained from a light shielded pixel being used as a reference of black level; a storage unit for storing a correction table described with a relationship of a signal corresponding to a dark current generated in the vertical pre-stage optical black unit and an optical black level difference which is a difference between a black level in the vertical pre-stage optical black unit and a black level of an image signal; and an optical black level difference correcting unit for performing a process by sectionalizing the vertical pre-stage optical black unit to a first region positioned on a side opposite to the effective pixel unit along the vertical transfer direction and a second region positioned on the effective pixel unit side and read out after the first region, and calculating a correction amount for correcting the optical black level difference using a signal corresponding to the dark current obtained from the first region and the correction table.

According to such configuration, the effective pixel unit converts the light entered to a pixel to a signal charge and outputs as an effective pixel signal; and the vertical pre-stage optical black unit is arranged at a pre-stage of the effective pixel unit along a vertical transfer direction, a signal obtained from a light shielded pixel being used as a reference of black level. A storage unit stores a correction table described with a relationship of a signal corresponding to a dark current generated in the vertical pre-stage optical black unit and an optical black level difference which is a difference between a black level in the vertical pre-stage optical black unit and a black level of an image signal. The optical black level difference correcting unit performs a process by sectionalizing the vertical pre-stage optical black unit to a first region positioned on a side opposite to the effective pixel unit along the vertical transfer direction and a second region positioned on the effective pixel unit side and read out after the first region, and calculates a correction amount for correcting the optical black level difference using a signal corresponding to the dark current obtained from the first region and the correction table.

Preferably, the imaging element further includes a dummy pixel unit arranged at a pre-stage along the vertical transfer direction of the vertical pre-stage optical black unit, and the optical black level difference correcting unit references the correction table based on a difference between a magnitude of the signal corresponding to the dark current obtained from the first region and a magnitude of the signal corresponding to the dark current obtained from the dummy pixel unit, and calculates the correction amount of the optical black level difference corresponding to such difference.

The optical black level difference correcting unit preferably calculates the correction amount through linear interpolation based on the magnitude of the signal corresponding to the dark current and the magnitude of the optical black level difference described in the correction table, and the difference between the magnitude of the signal corresponding to the dark current obtained from the first region and the magnitude of the signal corresponding to the dark current obtained from the dummy pixel unit.

Preferably, the imaging apparatus further includes a clamp circuit unit for clamping the vertical pre-stage optical black unit, and the clamp circuit unit does not perform clamping in the first region and performs clamping to a predetermined level in the second region.

According to another embodiment of the present invention, there is provided an adjustment method of a black level including the steps of: acquiring, in an imaging element including an effective pixel unit for converting a light entered to a pixel to a signal charge and outputting as an effective pixel signal, and a vertical pre-stage optical black unit arranged at a pre-stage of the effective pixel unit along a vertical transfer direction, a signal obtained from a light shielded pixel being used as a reference of black level, a signal corresponding to a dark current from a first region positioned on a side opposite to the effective pixel unit along the vertical transfer direction of a vertical pre-stage optical black unit; and calculating a magnitude of an optical black level difference to be corrected using a correction table described with a relationship of a signal corresponding to a dark current generated in the vertical pre-stage optical black unit and the optical black level difference which is a difference between a black level in the vertical pre-stage optical black unit and a black level of an image signal, and a signal corresponding to the dark current obtained from the first region.

According to another embodiment of the present invention, there is provided a program for causing a computer to realize an optical black level difference correcting function, the computer controlling an imaging element including an effective pixel unit for converting a light entered to a pixel to a signal charge and outputting as an effective pixel signal, and a vertical pre-stage optical black unit arranged at a pre-stage of the effective pixel unit along a vertical transfer direction, a signal obtained from a light shielded pixel being used as a reference of black level; the optical black level difference correcting function including: performing a process by sectionalizing the vertical pre-stage optical black unit to a first region positioned on a side opposite to the effective pixel unit along the vertical transfer direction and a second region positioned on the effective pixel unit side and read out after the first region, and calculating a correction amount for correcting the optical black level difference using a signal corresponding to a dark current obtained from the first region and a correction table described with a relationship of a signal corresponding to the dark current generated in the vertical pre-stage optical black unit and an optical black level difference which is a difference between a black level in the vertical pre-stage optical black unit and a black level of an image signal.

According to such configuration, the computer program is stored in the storage unit arranged in the computer, and is read out and executed by a CPU arranged in the computer to cause the relevant computer to function as the imaging apparatus. A computer readable recording medium recorded with the computer program can be also provided. The recording medium may be a magnetic disc, optical disc, magnetic-optical disc, flash memory, and the like. The computer program may be distributed via network without using the recording medium.

According to the embodiments of the present invention described above, the optical black level difference generated in the imaging element can be accurately corrected without involving addition of sensor and the like and increase in the circuit scale.

BRIEF DESCRIPTION OF THE DRAWINGS

FIG. 11A is an explanatory view for describing an adjustment method of a black level of the related art.

DETAILED DESCRIPTION OF THE PREFERRED EMBODIMENTS

Figure 1:
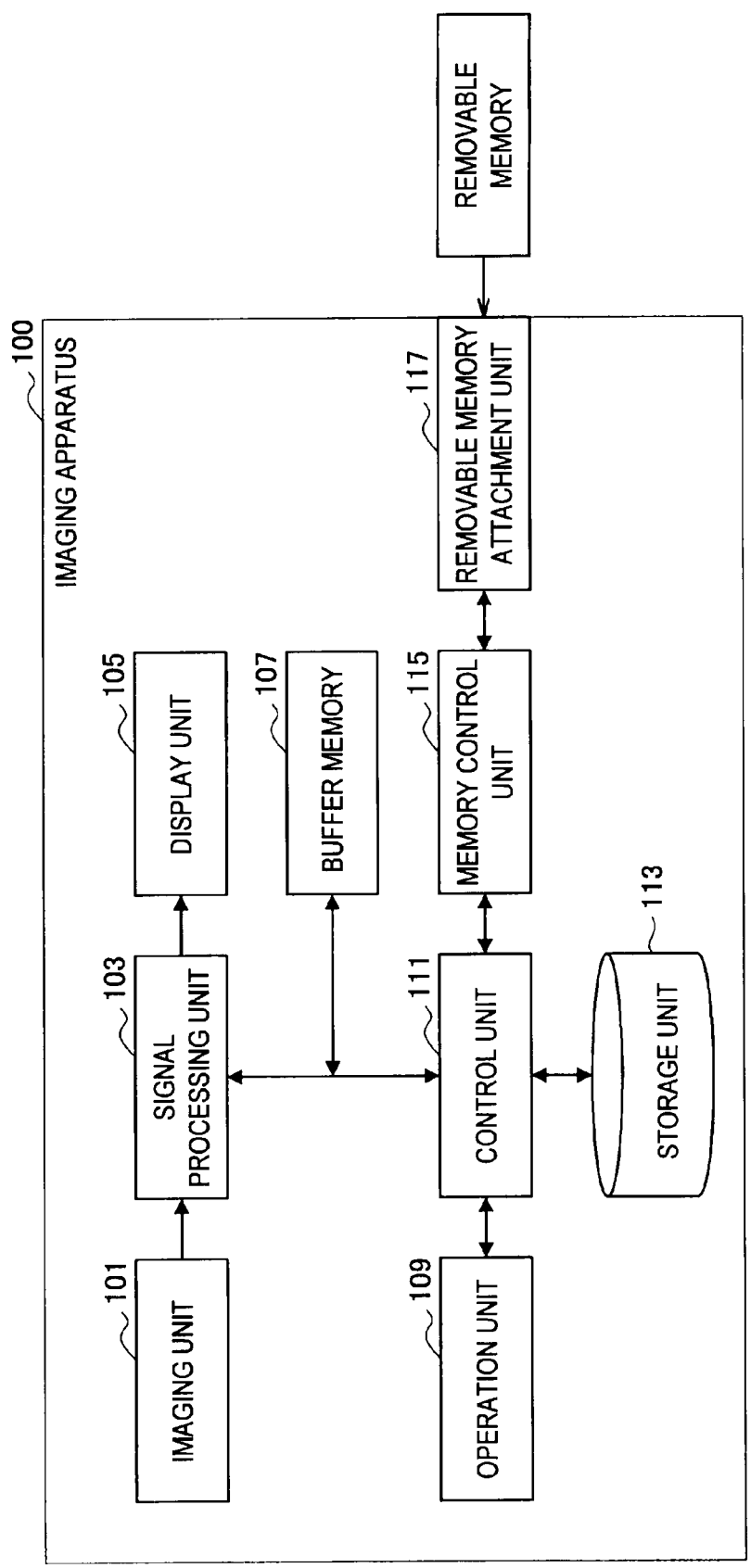
FIG. 1 is a block diagram for describing a configuration of an imaging apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
(1) Regarding adjustment method of black level of related art
(2) First embodiment
(1-1) Regarding configuration of imaging apparatus
(1-2) Regarding method of creating correction table
(1-3) Regarding adjustment method of black level
(3) Conclusion
<Regarding Adjustment Method of Black Level of Related Art>

Figure 10:
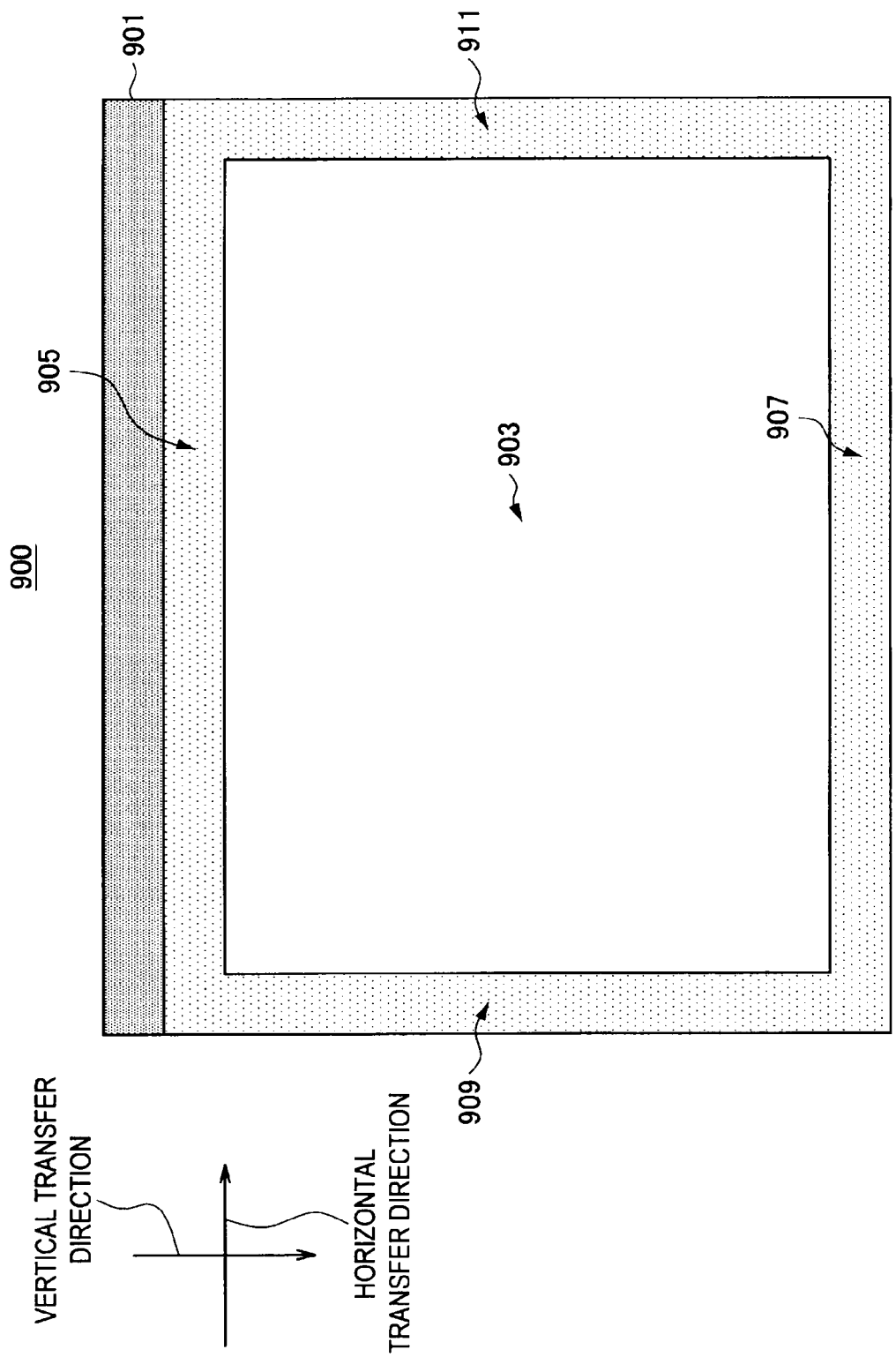
FIG. 10 is an explanatory view for describing a configuration of an imaging element.
Figure 11B:
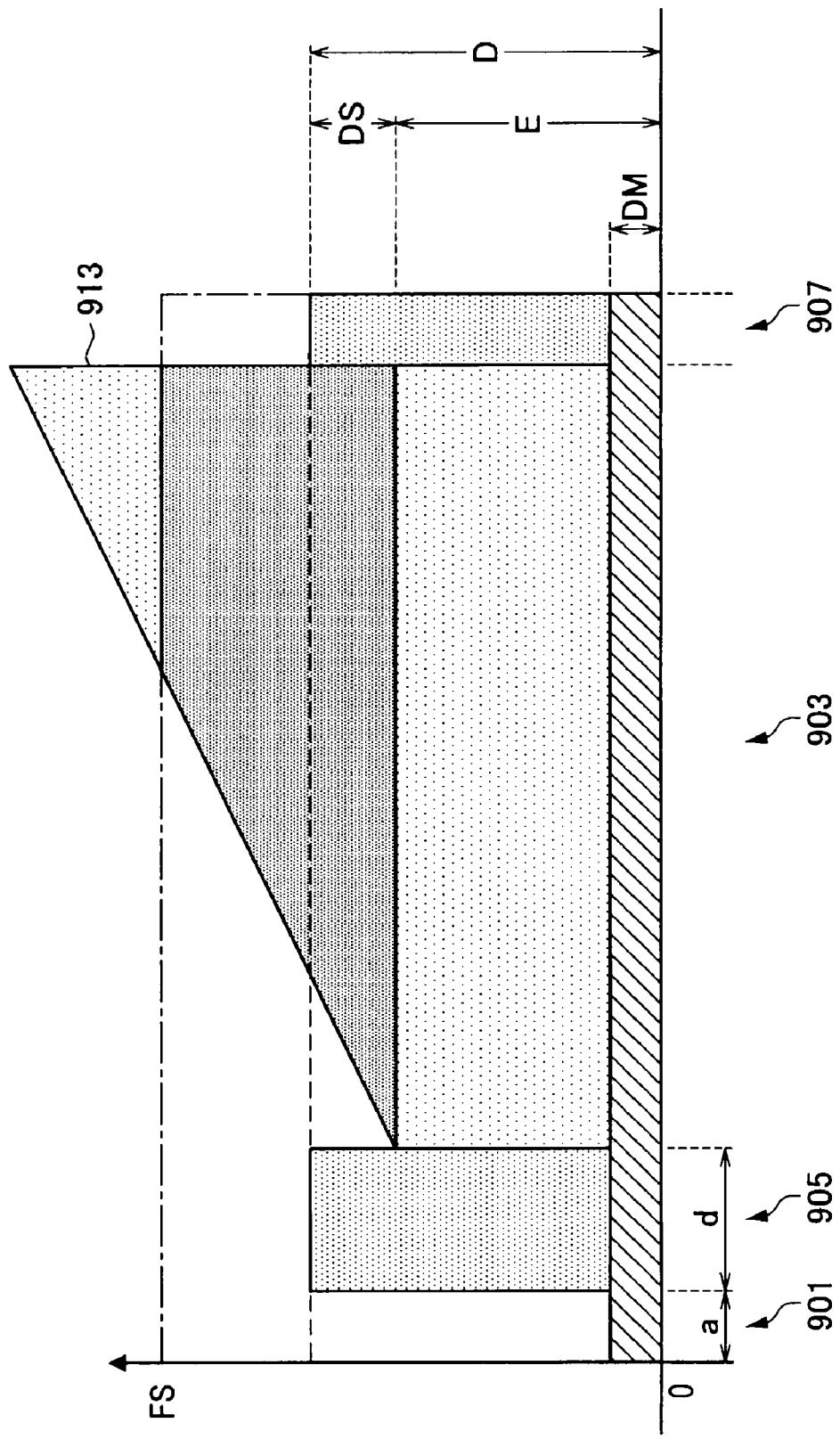
FIG. 11B is an explanatory view for describing the adjustment method of the black level of the related art.

First, the adjustment method of the black level of the related art will be described in detail with reference to FIGS. 10 to 11B. FIG. 10 is an explanatory view for describing a configuration of an imaging element. FIGS. 11A and 11B are explanatory views for describing the adjustment method of the black level of the related art.

As shown in FIG. 10, a general imaging element 900 mainly includes a dummy pixel unit (also referred to as simulated black level pixel unit) 901, an effective pixel unit 903, a vertical pre-stage optical black unit 905, a vertical post-stage optical black unit 907, a horizontal pre-stage optical black unit 909, and a horizontal post-stage optical black unit 911.

As shown in FIG. 10, the dummy pixel unit 901 is arranged in the vicinity of a starting position in the vertical transfer direction, a photodiode is not arranged, and only a predetermined wiring is formed. An output signal obtained by the dummy pixel unit 901 can be handled as a simulated black level signal.

As shown in FIG. 10, the effective pixel unit 903 is arranged at substantially the central portion of the imaging element 900, and converts a light entered to the pixel to a signal charge and outputs as an effective pixel signal. The optical black unit (hereinafter abbreviated as OB unit) is formed at the periphery of the effective pixel unit 903, as shown in FIG. 10.

The optical black unit is configured by light-shielded pixels, where a signal obtained from the light-shielded pixel is used as a reference of the black level of the imaging element 900. The optical black unit is sectionalized to the vertical pre-stage OB unit 905, the vertical post-stage OB unit 907, the horizontal pre-stage OB unit 909, and the horizontal post-stage OB unit 911, as shown in FIG. 10.

The vertical pre-stage OB unit 905 is the OB unit arranged on the starting position side in the vertical transfer direction, and the vertical post-stage OB unit 907 is the OB unit positioned on the opposite side of the vertical pre-stage OB unit 905 by way of the effective pixel unit 903. The horizontal pre-stage OB unit 909 is the OB unit arranged on the starting position side in the horizontal transfer direction, and the horizontal post-stage OB unit 911 is the OB unit positioned on the opposite side of the horizontal pre-stage OB unit 909 by way of the effective pixel unit 903.

In the method described in Japanese Patent Application Laid-Open No. 2000-152098, the OB level is detected after AD converting the image signal of after clamping. If the dark current is large, in the image signal of after clamping, the base portion in level measurement becomes a negative value in the vertical pre-stage OB unit 905, that is, in the region d of FIG. 11A, as shown in FIG. 11A. The value to detect as the dark current is the difference "D–DM" between an average value D of the vertical pre-stage OB unit 905 (correspond to region d) and an average value DM of the dummy pixel unit 901 (correspond to region a). However, the dark current D–DM may not be detected since the AD converter for the normal camera clips a signal of smaller than or equal to a predetermined reference voltage ($V_{RB}(V_{Reference\ Bottom})$) as a negative component. In other words, the AD converter uses only the region of 0 to FS shown in FIG. 11A as the processing target, and thus the negative component becomes difficult to accurately detect.

In order to solve such issue, the following two methods can be considered. The first method is a method of AD converting −FS to +FS in FIG. 11A to hold the data without clipping even if the negative component generates by clamping. Here, FS (Full Scale) is a value represented by $V_{RT}(V_{Reference\ Top})$–$V_{RB}$, as apparent from FIG. 11A.

However, the first method has an issue in that the circuit scale doubles as the bit length of the AD conversion circuit and the detection circuit of the AD converter becomes long by one bit.

The second method is a method of not performing the clamping process so as not to generate the negative component. In this method, an issue of generation of the negative component does not arise since all values are positive values, as shown in FIG. 11B.

However, when the frequency the image signal exceeds the FS increases, the portion 913 exceeding the FS remains at a maximum value and does not change, and thus loss of dynamic range consequently occurs.

The inventors of the subject application performed thorough research to solve such issue, and as a result, contrived an adjustment method of the black level capable of accurately correcting the OB level difference that occurs in the imaging element without involving further addition of sensor and the like and increase in circuit scale.

First Embodiment

<Regarding Configuration of Imaging Apparatus>

The configuration of the imaging apparatus according to a first embodiment of the present invention will be described in detail below with reference to FIGS. 1 to 7. The following description is made using the digital still camera as an example of the imaging apparatus.

[Overall Configuration of Imaging Apparatus]

FIG. 1 is a block diagram for describing a configuration of the imaging apparatus 100 according to the present embodiment. As shown in FIG. 1, the imaging apparatus 100 according to the present embodiment mainly includes an imaging unit 101, a signal processing unit 103, a display unit 105, a buffer memory 107, an operation unit 109, a control unit 111, a storage unit 113, a memory control unit 115, and a removable memory attachment unit 117.

The imaging unit 101 includes an imaging element such as CCD and CMOS, a lens optical system for imaging an object image on an imaging plane of the imaging element, a lens drive circuit for driving the shutter and the lens optical system, and the like. The image signal obtained through photoelectric conversion in the imaging element of the imaging unit 101 is transmitted to the signal processing unit 103, to be hereinafter described.

The imaging unit 101 according to the present embodiment will be described in detail below.

The signal processing unit 103 performs signal processing such as synchronization, gamma correction, matrix, and white balance, and processes such as JPEG compression on the image signal transmitted from the imaging unit 101. The signal processing unit 103 may be a dedicated circuit capable of executing such processes, or the processes may be performed by the CPU (Central Processing Unit) and the like.

The display unit 105 is configured to include a liquid crystal display (LCD), an electronic view finder (EVF) and the like. The display unit 105 receives the image signal processed in the signal processing unit 103, and displays the imaged image on the LCD or the EVF.

The buffer memory 107 is a memory such as SDRAM (Synchronous Dynamic Random Access Memory) used as a data buffer. The buffer memory 107 temporarily holds the image data (image signal) generated by the imaging unit 101, the image data processed in the signal processing unit 103, and the like.

The operation unit 109 includes various types of operation buttons such as shutter button and zoom button arranged on the imaging apparatus 100. The operation unit 109 converts the operation information input from the buttons to a predetermined signal corresponding to the operation information, and transmits the signal to the control unit 107, to be hereinafter described.

The control unit 111 is configured to include CPU (Central Processing Unit), ROM (Read Only Memory), RAM (Random Access Memory), and the like. The control unit 111 performs the control of the imaging apparatus 100 according to the present embodiment (more specifically, control of each processing unit configuring the imaging apparatus 100) according to various programs stored in advance in the storage unit 113, to be hereinafter described.

The storage unit 113 is configured to include a flash memory and the like, and holds the program, the parameter, the table and the like necessary for signal processing in the imaging unit 101, the signal processing unit 103, the memory control unit 115, to be hereinafter described, and the like. Each processing unit of the imaging apparatus 100 according to the present embodiment can freely read and write on the storage unit 113.

The memory control unit 115 records the image signal transmitted from the signal processing unit 103 on a removable memory attached to the removable memory attachment unit 117 based on a predetermined file system. As a result, the image signal subjected to various types of processing by the signal processing unit 103 can be recorded in the removable memory as an image file.

In photographing, the operation information is input to the control unit 111 by the operation of the shutter button included in the operation unit 109, and the control unit 111 performs the control according to the program stored in advance in the storage unit 113. The image signal transmitted from the imaging unit 101 is subjected to various types of processing in the signal processing unit 103. The processed image signal is recorded in the removable memory as data of the imaged image in the format complying with the file system defined in advance under the control of the memory control unit 115.

Specifically, the image signal transmitted from the imaging unit 101 is subjected to signal processing such as synchronization, gamma correction, matrix, and white balance in the signal processing unit 103, and converted to an image signal such as YCbCr to create an image for recording file. In image processing in the signal processing unit 103, the buffer memory 107 is used as a buffer, as necessary.

[Regarding Configuration of Imaging Unit 101]

The imaging unit 101 arranged in the imaging apparatus 100 according to the present embodiment will be described in detail with reference to FIGS. 2 to 7.

Figure 2:
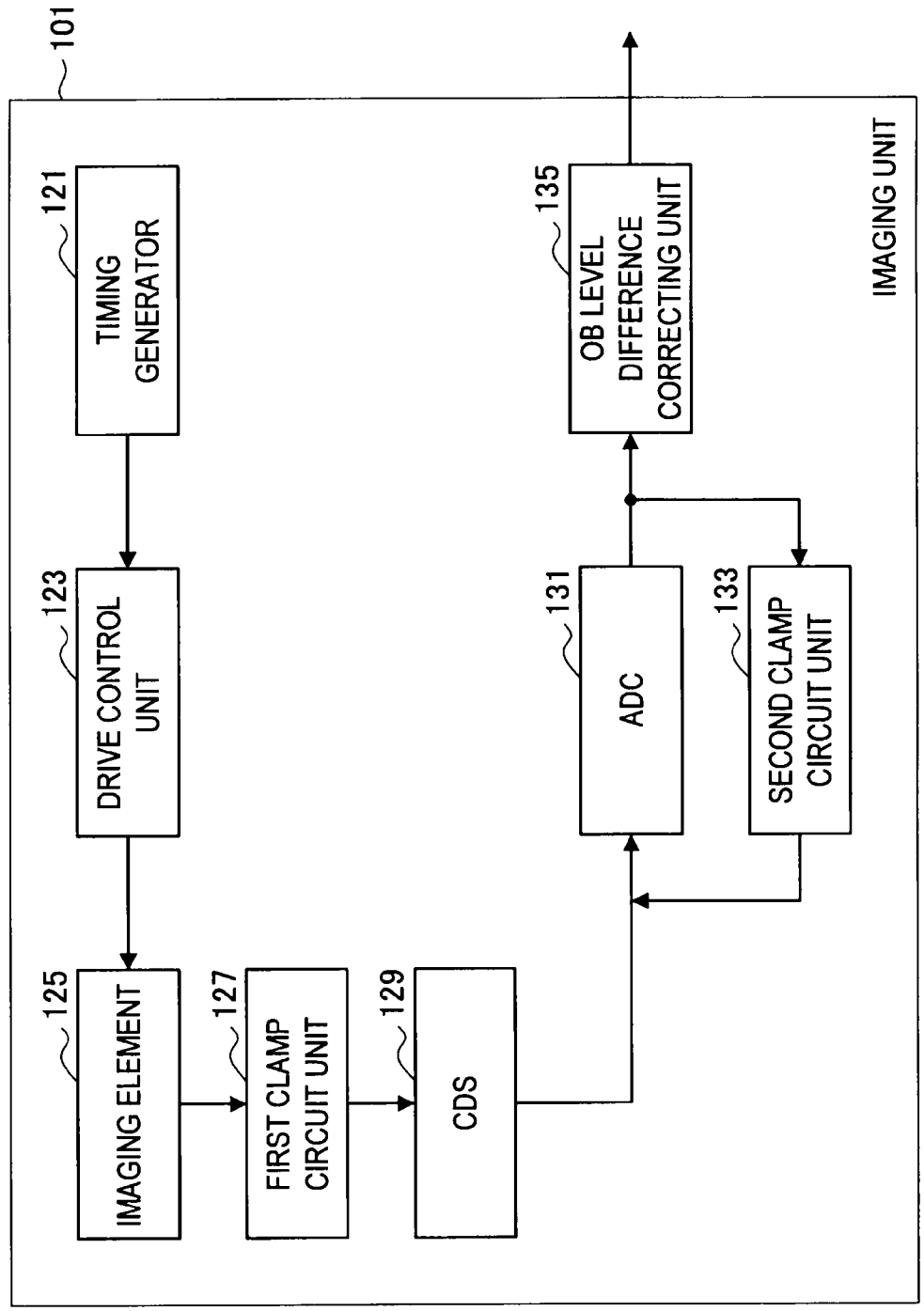
FIG. 2 is a block diagram for describing the configuration of an imaging unit according to the present embodiment.

FIG. 2 is a block diagram for describing the configuration of the imaging unit 101 according to the present embodiment. As shown in FIG. 2, the imaging unit 101 according to the present embodiment mainly includes a timing generator 121, a drive control unit 123, an imaging element 125, a first clamp circuit unit 127, a correlated double sampling circuit unit 129, an AD converter 131, a second clamp circuit unit 133, and an OB level difference correcting unit 135.

The timing generator 121 generates a timing pulse for driving the imaging element 125, to be hereinafter described. The timing generator generates a pulse necessary for the processing executed by the first clamp circuit unit 127, the correlated double sampling circuit unit 129, the AD converter 131, the second clamp circuit unit 133, and the OB level difference correcting unit 135, to be hereinafter described.

The drive control unit 123 performs the drive control of the imaging element 125, to be hereinafter described, based on the timing pulse generated by the timing generator 121. More specifically, the drive control unit 123 controls the imaging element 125 based on the vertical transfer pulse, the horizontal transfer pulse, the charge sweep pulse, and the like generated by the timing generator 121.

The imaging element 125 photoelectric converts the light imaged on the imaging plane by the lens optical system (not shown) and the shutter (not shown), and outputs as the image signal. The imaging element 125 has a configuration shown in FIG. 3.

Figure 3:
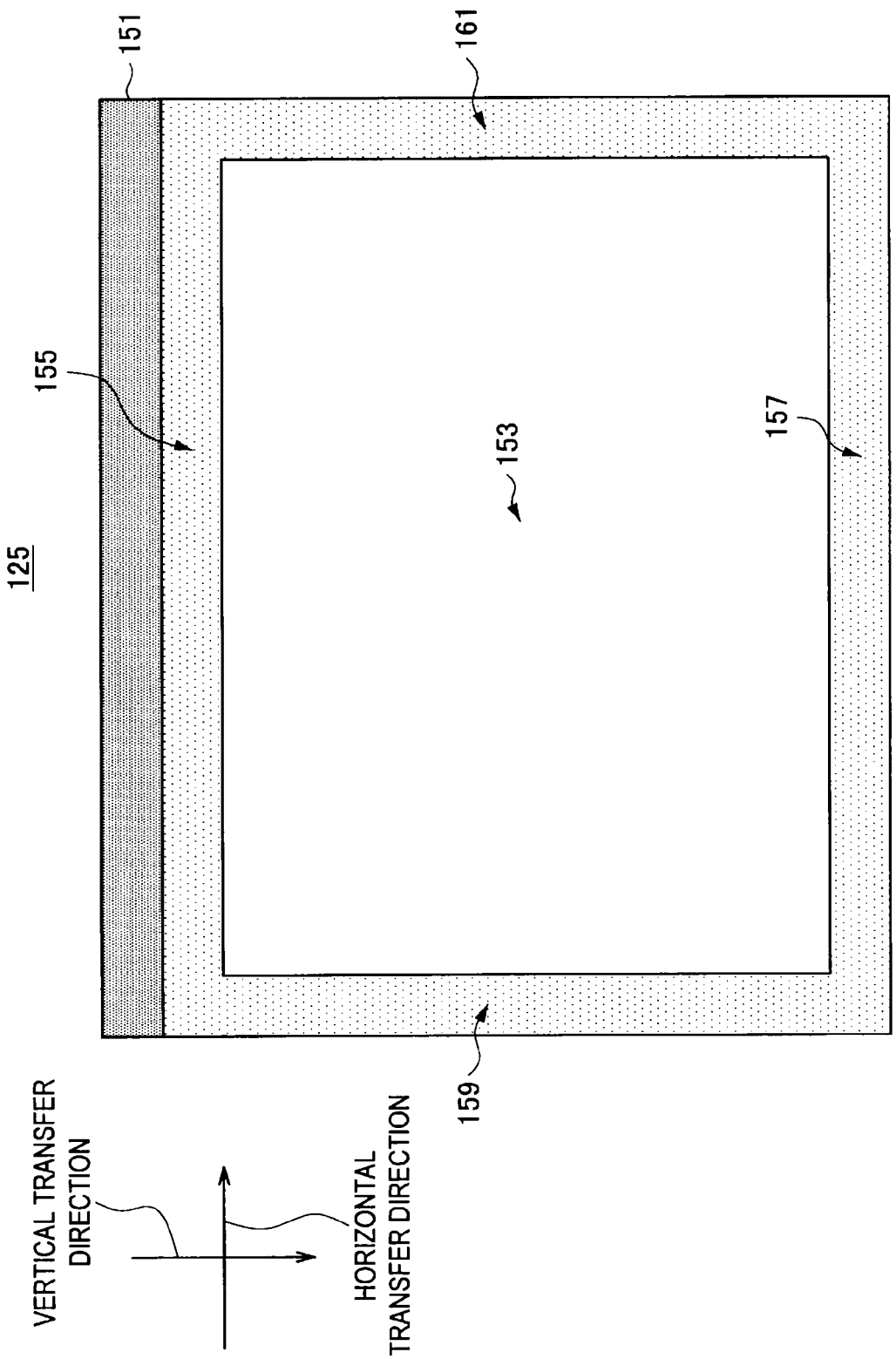
FIG. 3 is an explanatory view for describing the configuration of an imaging element according to the present embodiment.

FIG. 3 is an explanatory view for describing the configuration of the imaging element 125. As shown in FIG. 3, the imaging element 125 mainly includes a dummy pixel unit (also referred to as simulated black level pixel unit) 151, an effective pixel unit 153, a vertical pre-stage optical black unit 155, a vertical post-stage optical black unit 157, a horizontal pre-stage optical black unit 159, and a horizontal post-stage optical black unit 161.

As shown in FIG. 3, the dummy pixel unit 151 is arranged in the vicinity of a starting position in the vertical transfer direction, a photodiode is not arranged, and only a predetermined wiring is formed. An output signal obtained by the dummy pixel unit 151 can be handled as a simulated black level signal.

As shown in FIG. 3, the effective pixel unit 153 is arranged at substantially the central portion of the imaging element 125, and converts a light entered to the pixel to a signal charge and outputs as an effective pixel signal. The optical black unit (OB unit) is formed at the periphery of the effective pixel unit 153, as shown in FIG. 3.

The OB unit is configured by light-shielded pixels, where a signal obtained from the light-shielded pixel is used as a reference of the black level of the imaging element 125. The OB unit is sectionalized to the vertical pre-stage OB unit 155, the vertical post-stage OB unit 157, the horizontal pre-stage OB unit 159, and the horizontal post-stage OB unit 161, as shown in FIG. 3.

The vertical pre-stage OB unit 155 is the OB unit arranged on the starting position side in the vertical transfer direction, and the vertical post-stage OB unit 157 is the OB unit positioned on the opposite side of the vertical pre-stage OB unit 155 by way of the effective pixel unit 153. The horizontal pre-stage OB unit 159 is the OB unit arranged on the starting position side in the horizontal transfer direction, and the horizontal post-stage OB unit 161 is the OB unit positioned on the opposite side of the horizontal pre-stage OB unit 159 by way of the effective pixel unit 153.

The signal of each pixel unit output from the imaging element 125 having the configuration shown in FIG. 3 is transmitted to the correlated double sampling circuit unit 129 via the first clamp circuit unit 127, to be hereinafter described.

The method of adjusting the black level using the signal of each pixel unit obtained from the imaging element 125 will be described in detail below.

The first clamp circuit unit 127 clamps the signal of a period corresponding to the dummy pixel unit 151 of the imaging element 125, that is, the simulated black level signal output from the dummy pixel unit 151 to a first clamp target value based on the pulse generated by the timing generator 121. The first clamp target value can be set to an arbitrary value according to the performance and the like of the imaging element 125 used.

The correlated double sampling circuit (CDS) 129 removes the noise contained in the signal output from the imaging element 125 based on the pulse generated by the timing generator 121. The noise includes low frequency noise caused by fluctuation of the reset level contained in the signal output from the imaging element 125, and 1/f noise caused by the transistor included in the imaging element 125. The CDS 129 transmits various types of signals removed with noise to the AD converter 131, to be hereinafter described.

The AD converter (Analog to Digital Converter: ADC) 131 converts an input analog signal to a digital signal based on the pulse generated by the timing generator 121. The analog signal input to the ADC 131 includes the signal transmitted from the CDS 129, and the analog signal transmitted from the second clamp circuit unit 133, to be hereinafter described. The ADC 131 transmits the digital signal obtained as a result of the conversion to the OB level difference correcting unit 135, to be hereinafter described.

The second clamp circuit unit 133 clamps the signal of a period corresponding to a predetermined region of the imaging element 125 to a second clamp target value based on the pulse generated by the timing generator 121. In the imaging unit 101 according to the present embodiment, the vertical pre-stage OB unit 155 is processed by being sectionalized to a first region positioned on the dummy pixel unit 151 side and a second region positioned on the effective pixel unit 153 side and to be read after the first region. The second clamp circuit unit 133 clamps the signal of the period corresponding to the first region of the vertical pre-stage OB unit 155 to the second clamp target value. In other words, the second clamp circuit unit 133 can be assumed as a clamp circuit unit for clamping the vertical pre-stage OB unit 155.

Figure 4:
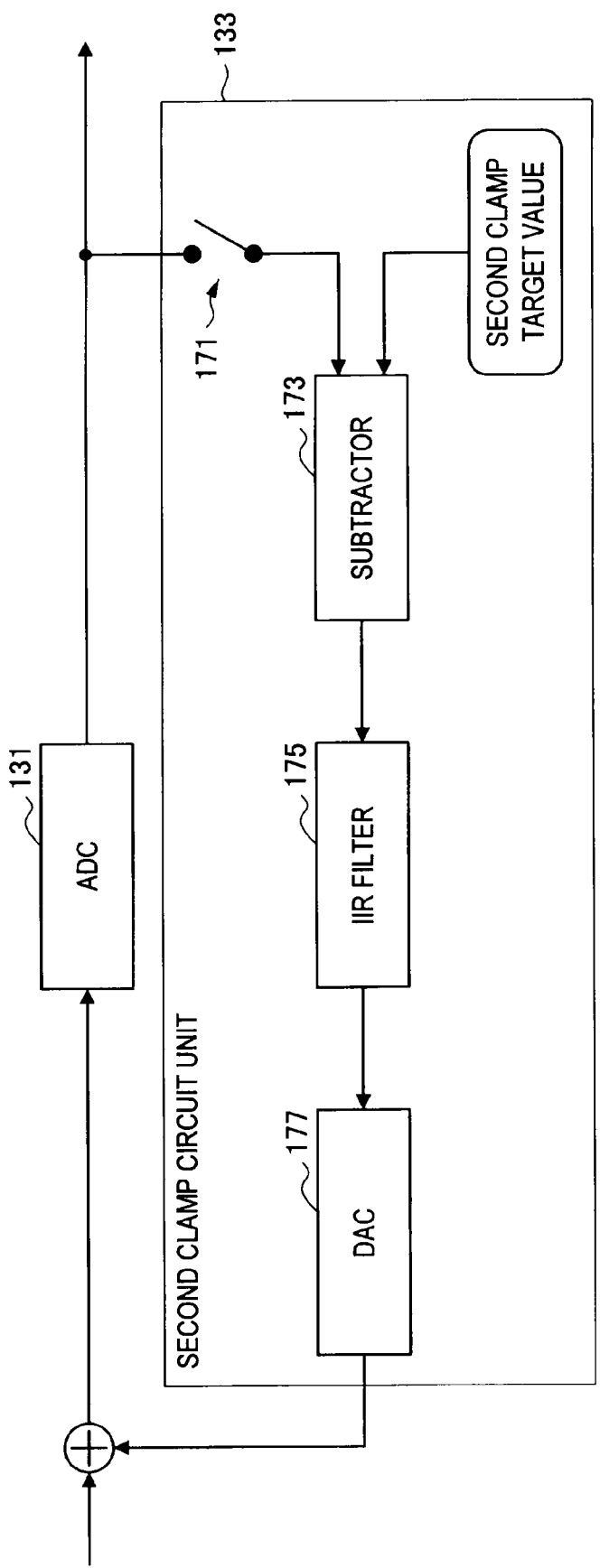
FIG. 4 is a block diagram for describing an example of a second clamp circuit unit according to the present embodiment.

FIG. 4 is a block diagram for describing an example of the second clamp circuit unit 133 according to the present embodiment. As shown in FIG. 4, the second clamp circuit unit 133 mainly includes a switch circuit unit 171, a subtractor 173, an IIR filter 175, and a DA converter 177.

The switch circuit unit 171 opens and closes the circuit configuring the second clamp circuit unit 133 based on the clamp gate pulse generated in the timing generator 121. More specifically, when a signal corresponding to the second region of the vertical pre-stage OB unit 155 is input, the clamp gate pulse becomes Hi. The switch circuit unit 171 switches the switch to close the circuit configuring the second clamp circuit unit 133 in response to the clamp gate pulse of Hi.

The subtractor 173 calculates a difference between a signal output from the ADC 131 and the second clamp target value input to the subtractor 173. If the level of the signal output from the ADC 131 greatly differs from the second clamp target value, the difference output from the subtractor 173 takes a large value. As the level of the signal output from the ADC 131 approaches the second clamp target value, the difference output from the subtractor 173 takes a small value. The subtraction result obtained by the subtractor 173 is transmitted to the IIR (Infinite Impulse Response) filter 175, to be hereinafter described.

The IIR filter 175 averages the values transmitted from the subtractor 173 based on a predetermined time constant. The IIR filter 175 transmits the averaged value to the DA converter 177, to be hereinafter described.

The DA converter (Digital to Analog Converter: DAC) 177 converts the digital signal transmitted from the IIR filter 175 to an analog signal based on the pulse generated by the timing generator 121. The analog signal obtained as a result of conversion is added to the analog signal transmitted from the CDS 129.

The second clamp circuit unit 133 can clamp the signal corresponding to the second region of the vertical pre-stage OB unit 155 to the second clamp target value by adopting such configuration.

In the example described above, an example using the IIR filter has been described as a filter for averaging the values transmitted from the subtractor 173, but the second clamp circuit unit 133 can be designed using an FIR (Finite Impulse Response) filter.

The OB level difference correcting unit 135 corrects the OB level difference produced in the imaging element 125 based on the pulse generated by the timing generator 121. More specifically, the OB level difference correcting unit 135 calculates the correction amount for correcting the OB level difference based on the dark current obtained from the first region of the vertical pre-stage OB unit 155 and the correction table recorded in the storage unit 113. Here, the OB level difference is defined as a difference between the black level in the vertical pre-stage OB unit and the black level of the image signal.

Figure 5:
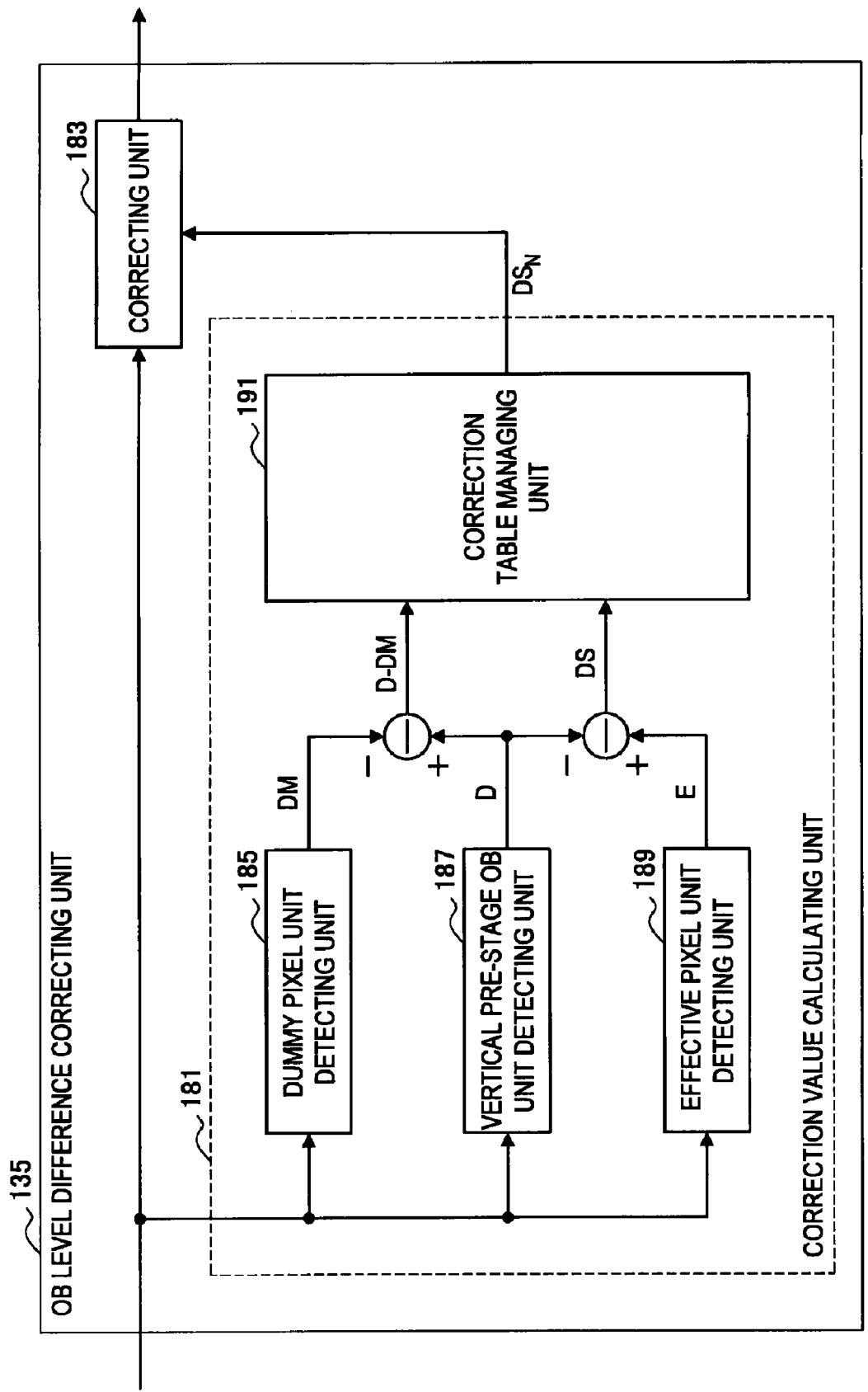
FIG. 5 is a block diagram for describing a configuration of an OB level difference correcting unit according to the present embodiment.

FIG. 5 is a block diagram for describing an example of the OB level difference correcting unit 135 according to the present embodiment. As shown in FIG. 5, the OB level difference correcting unit 135 is configured to include a correction value calculating unit 181 and a correcting unit 183.

As shown in FIG. 5, the correction value calculating unit 181 mainly includes a dummy pixel unit detecting unit 185, a vertical pre-stage OB unit detecting unit 187, an effective pixel unit detecting unit 189, and a correction table managing unit 191.

The dummy pixel unit detecting unit 185 detects an average value of the signal voltage corresponding to the dark current output from the dummy pixel unit 151 through average value detection and the like during a period corresponding to the dummy pixel unit 151 of the imaging element 125 of the digital signals transmitted from the ADC 131. The average value of the signal voltage obtained from the dummy pixel unit detecting unit 185 is hereinafter abbreviated as "DM". The dummy pixel unit detecting unit 185 outputs the average value "DM" of the obtained signal voltage.

The vertical pre-stage OB unit detecting unit 187 detects an average value of the signal voltage corresponding to the dark current output from the first region through average value detection and the like during a period corresponding to the first region of the vertical pre-stage OB unit 155 of the digital signals transmitted from the ADC 131. The average value of the signal voltage obtained from the first region of the vertical pre-stage OB unit 155 is hereinafter abbreviated as "D". The vertical pre-stage OB unit detecting unit 187 outputs the average value "D" of the obtained signal voltage.

The difference "D−DM" of the average value "D" output from the vertical pre-stage OB unit detecting unit 187 and the average value "DM" output from the dummy pixel unit detecting unit 185 is transmitted to the correction table managing unit 191, to be hereinafter described.

The effective pixel unit detecting unit 189 detects an average value of the signal voltage output from the effective pixel unit 153 through average value detection and the like during a period corresponding to the effective pixel unit 153 of the imaging element 125 of the digital signals transmitted from the ADC 131. The average value of the signal voltage corresponding to the dark current of the effective pixel signal obtained from the effective pixel unit 153 is hereinafter abbreviated as "E". The effective pixel unit detecting unit 189 outputs the average value "E" of the obtained signal voltage.

The difference "E−D=DS" of the average value "E" of the signal voltage corresponding to the dark current output from the effective pixel unit detecting unit 189 and the average value "D" output from the vertical pre-stage OB unit detecting unit 187 is transmitted to the correction table managing unit 191, to be hereinafter described. As hereinafter described, "DS" corresponds to the magnitude of the OB level difference produced in the imaging element 125.

The correction table managing unit 191 manages the correction table used when calculating the correction amount for correcting the OB level difference. As hereinafter described, the correction table managing unit 191 has two main functions of a creating function of the correction table and a calculating function of the correction amount based on the correction table. When creating the correction table, the correction table managing unit 191 creates the correction table as shown in FIG. 6 based on the values of the transmitted "DS" and "D−DM".

Figure 6:
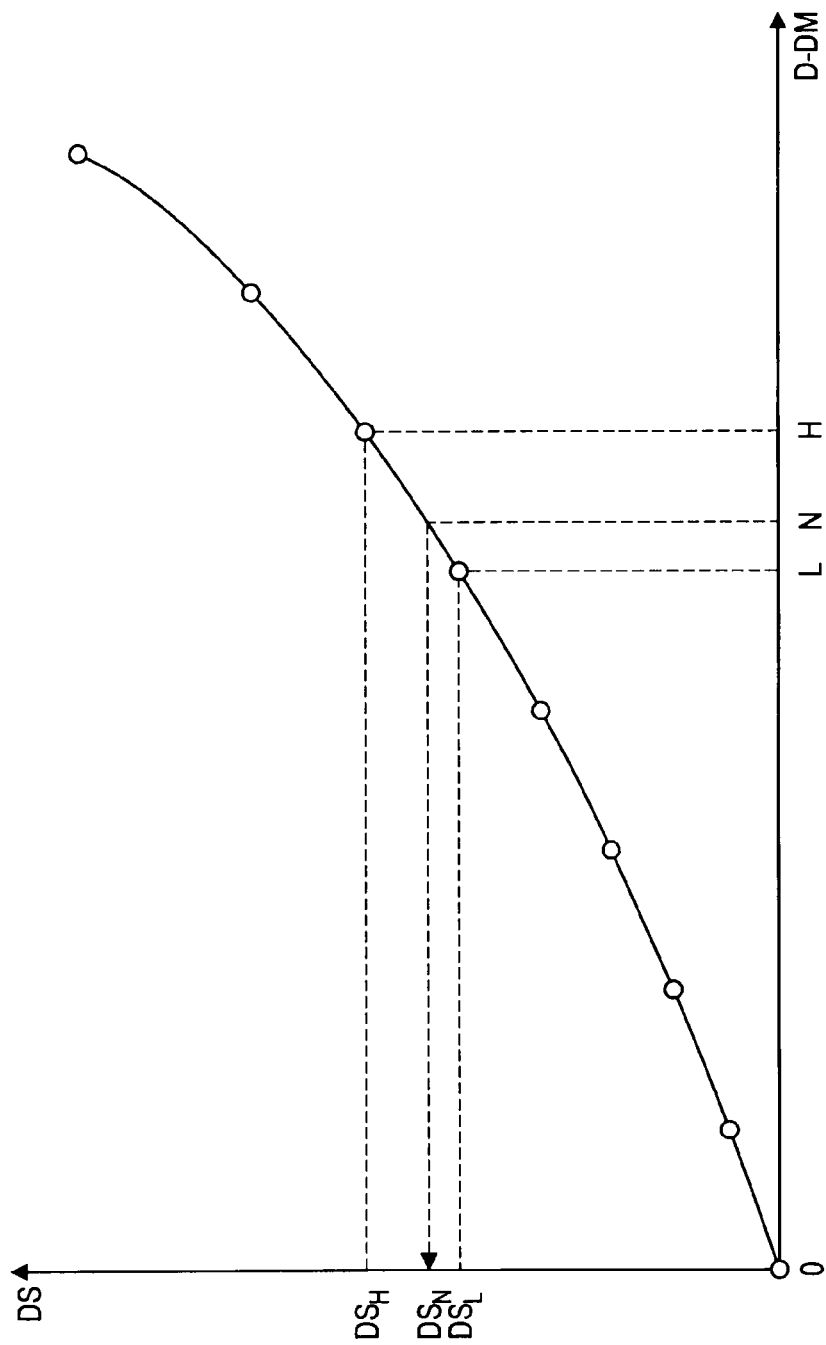
FIG. 6 is an explanatory view for describing an example of the correction table used by the OB level difference correcting unit according to the present embodiment.

FIG. 6 is an explanatory view for describing an example of the correction table used by the OB level difference correcting unit 135. As hereinafter described, when creating the correction table, the value of the produced OB level difference (i.e., value of "DS") is recorded while changing the generation condition of the dark current generated in the effective pixel unit 153. Changing the generation condition of the dark current generated in the effective pixel unit 153 is equivalent to changing the value of "D−DM". Therefore, the graph taking the "D−DM" on the horizontal axis and the "DS" on the vertical axis shows the relationship of the signal corresponding to the dark current generated in the vertical pre-stage OB unit 155 and the OB level difference. In the correction table shown in FIG. 6, "O" on the graph is the measurement value of the "D−DM" and the "DS".

The correction table managing unit 191 records the created correction table in the storage unit 113, the non-volatile memory, and the like. The graph itself shown in FIG. 6 may not be recorded, and the actual measurement values of the "D−DM" and the "DS" at the respective measurement point may be recorded in association to each other.

When the signal corresponding to the dark current generated in the vertical pre-stage OB unit 155 and the value of the OB level difference are in proportionality relation, only the proportional coefficient may be recorded as the correction table.

In actual photographing, the correction table managing unit 191 calculates the value of the OB level difference "DS" produced in the imaging element 125 using the average value "D−DM" transmitted to the correction table managing unit 191, and the above-described correction table.

For instance, as shown in FIG. 6, consider a case where the value of the average value "D−DM" transmitted to the correction table managing unit 191 is N. The correction table managing unit 191 references the correction table recorded in the storage unit 113, and the like to extract data L having the value of "D−DM" of smaller than or equal to N and data H having the value of "D−DM" of greater than or equal to N. The value $DS_L$ of the "DS" corresponding to the data L and the value $DS_H$ of the "DS" corresponding to the data H can be acquired by referencing the correction table. Thus, the correction table managing unit 181 calculates the value $DS_N$ of "DS" corresponding to N by linear interpolation as expressed with the following Equation 1 using such values.

$$DS_N = DS_L + \frac{(N-L) \cdot (DS_H - DS_L)}{H-L} \quad \text{(Equation 1)}$$

In selecting the data L having the value of "D−DM" of smaller than or equal to N, an arbitrary data can be selected as long as the data has a value of smaller than or equal to N, but data having a value closest to N is preferably selected. In selecting the data H having the value of "D−DM" of greater than or equal to N, an arbitrary data can be selected as long as the data has a value of greater than or equal to N, but data having a value closest to N is preferably selected. A more accurate value of $DS_N$ can be calculated by selecting such data.

The correction table managing unit 191 transmits the value "$DS_N$" calculated in such manner to the correcting unit 183, to be hereinafter described, as a correction value.

Figure 7:
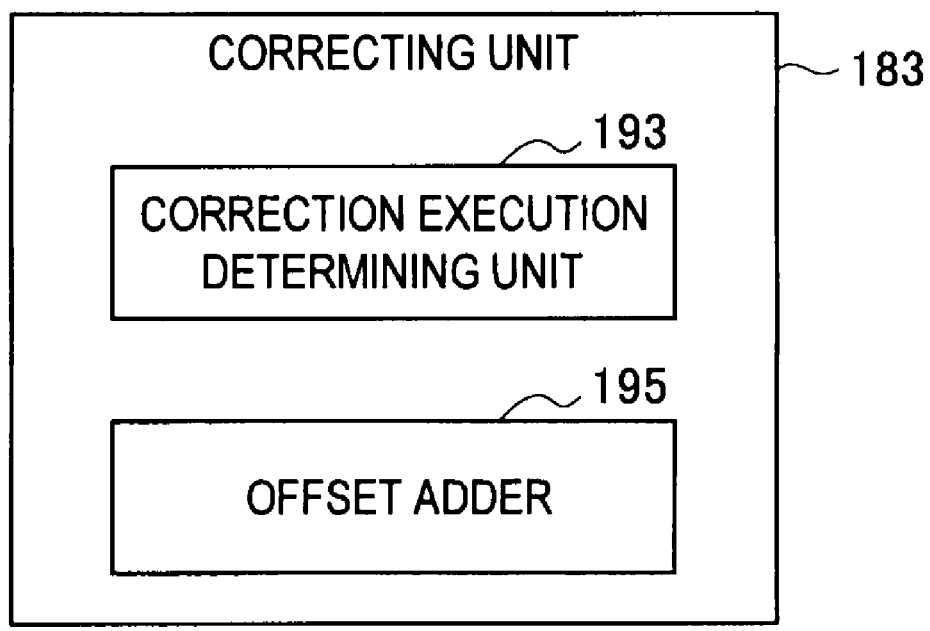
FIG. 7 is a block diagram for describing an example of a correcting unit of the OB level difference correcting unit according to the present embodiment.

The correcting unit 183 corrects the digital signal containing the signal originating from the OB level difference produced in the imaging element 125 based on the digital signal transmitted from the ADC 131 and the correction value $DS_N$ transmitted from the correction value calculating unit 181. FIG. 7 is a block diagram for describing an example of the correcting unit 183 according to the present embodiment. As shown in FIG. 7, the correcting unit 183 mainly includes a correction execution determining unit 193 and an offset adder 195.

The correction execution determining unit 193 determines whether or not the digital signal transmitted from the ADC 131 is a digital signal of a zone corresponding to the effective pixel unit 153 of the imaging element 125. Whether or not the transmitted digital signal is of the zone corresponding to the effective pixel unit 153 can be determined using an arbitrary method, and for example, can be determined based on the number of pixels of the imaging element 125 and the pulse generated by the timing generator 121. The correction execution determining unit 193 transmits the determination result to the offset adder 195, to be hereinafter described.

The correction execution determining unit 193 determines whether or not the digital signal transmitted from the ADC 131 is of a zone corresponding to a second region of the vertical pre-stage OB unit 155. The correction execution determining unit 193 specifies a signal corresponding to the terminating end of the second region and transmits the average value of such signal to the offset adder 195 when the transmitted digital signal is of the zone corresponding to the second region.

The offset adder 195 uniformly adds the correction value $DS_N$ transmitted from the correction table managing unit 191 to the transmitted digital signal when the digital signal transmitted from the ADC 131 is of the zone corresponding to the effective pixel unit 153. More specifically, the offset adder 195 holds the final average value of the second region (in other words, final average value transmitted from the second clamp circuit unit 133). The offset adder 195 uniformly subtracts the difference between the final average value of the second region, which it holds, and the second clamp target value from the signal of the zone corresponding to the effective pixel unit 153. If the OB level difference is not produced in the imaging element 125, the black level stabilizes at this point, and the dynamic range is ensured.

The offset adder 195 also uniformly adds the correction value $DS_N$ transmitted from the correction table managing unit 191 to the result of subtracting the difference of the final average value of the second region and the second clamp target value. The OB level difference can be accurately corrected by performing such offset correction on the signal of the zone corresponding to the effective pixel unit 153.

One example of the function of the imaging apparatus 100 according to the present embodiment has been described above. Each configuring elements described above may be configured using a universal member or a circuit, or may be configured to include a hardware specialized for the function of each configuring element. The function of each configuring element may all be performed by the CPU, and the like. Therefore, the configuration to use may be appropriately changed according to the technical level of when implementing the present embodiment.

When the imaging element 125 is a CMOS, part of or all of the processing units other than the imaging element shown in FIG. 1 may be incorporated in the imaging element.

<Regarding Method of Creating Correction Table>

Figure 8:
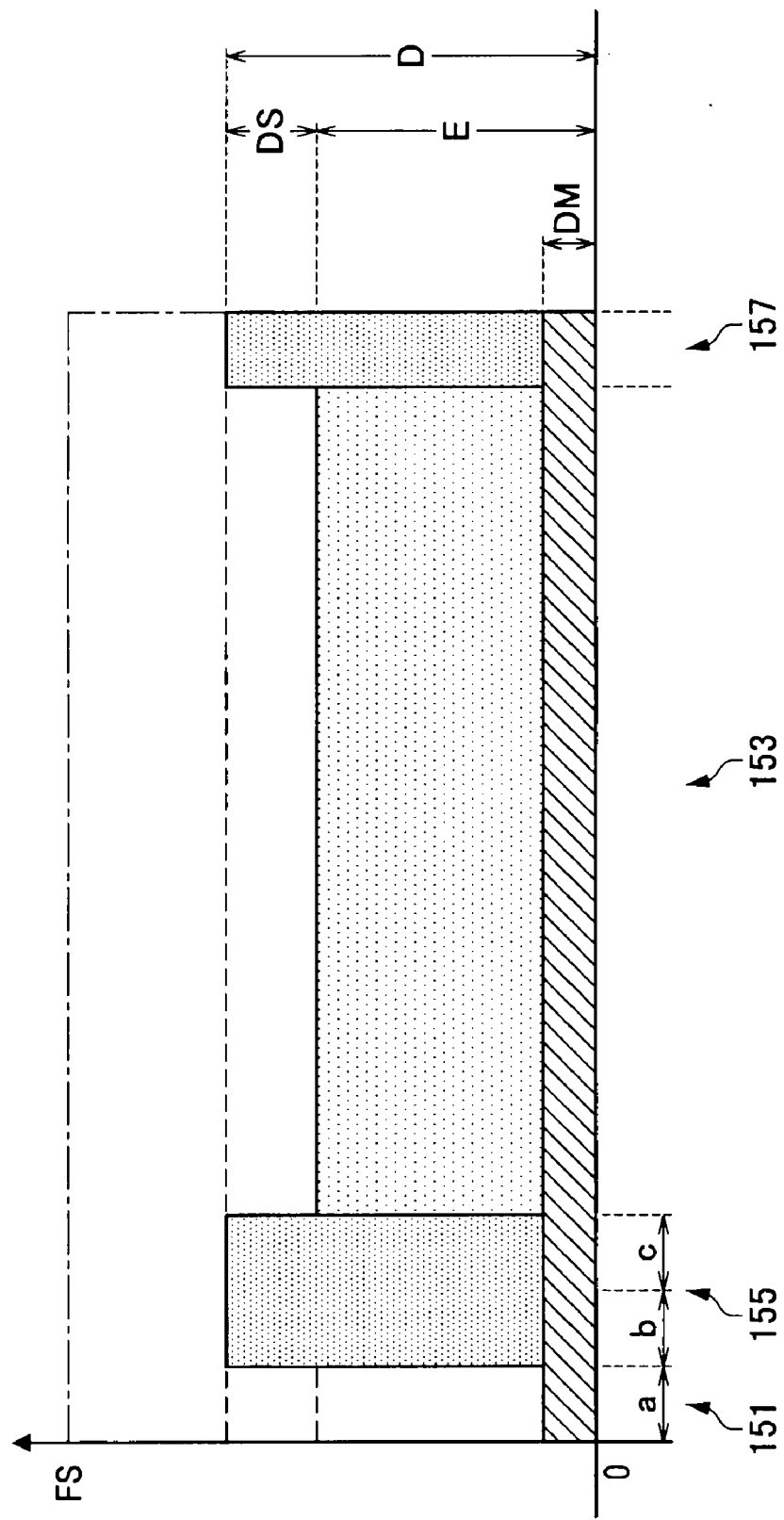
FIG. 8 is an explanatory view for describing a method of creating the correction table of the imaging apparatus according to the present embodiment.

The method of creating the correction table of the imaging apparatus according to the present embodiment will be specifically described below with reference to FIG. 8. FIG. 8 is an explanatory view for describing the method of creating the correction table of the imaging apparatus according to the present embodiment.

FIG. 8 schematically shows the relationship of the pixel configuration of the imaging element 125 and the signal level when creating the correction table. The horizontal axis of FIG. 8 shows the vertical transfer direction of the imaging element 125 and the vertical axis shows the signal level.

The zone represented with "a" of FIG. 8 is the zone corresponding to the dummy pixel unit 151, the zone represented with "b+c" is the zone corresponding to the vertical pre-stage OB unit 155, and the zone after "b+c" is the zone corresponding to the effective pixel unit 153. The zone represented with "b" represents the first region of the vertical pre-stage OB unit 155, and the zone represented with "c" represents the second region of the vertical pre-stage OB unit 155.

The zone represented with "b+c" is a length along the vertical transfer direction of the vertical pre-stage OB unit 155, and thus is constant. Furthermore, the length along the vertical transfer direction of "b" zone (i.e., first region) is determined according to the performance of S/N (Signal to Noise) ratio and the like of the imaging element 125. The length along the vertical transfer direction of "c" zone (i.e., second region) is determined according to what extent to converge the signal obtained from the second region.

In the imaging apparatus 100 according to the present embodiment, the length along the vertical transfer direction of the first region and the second region is set to, for example, 1:1. The length of the first region may be set longer or shorter than the length of the second region depending on the performance and the like of the imaging element 125. The lengths of the first region and the second region may be constant irrespective of the photographing conditions, and the like, or may be changed according to the photographing conditions and the like.

The correction table is created in time of factory shipment of the imaging apparatus 100, for example. The process of creating the correction table described below is performed by carrying out photographing in a light-shielded state. The light from the outside does not enter the imaging element 125 by performing photographing in the light-shielded state, and only the dark current generated in the imaging element 125 can be focused.

First, the first clamp circuit unit 127 of the imaging unit 101 clamps the signal output from the dummy pixel unit 151 to the first clamp target value during the "a" period. The switch circuit unit 171 of the second clamp circuit unit 133 is set to open. The dummy pixel unit detecting unit 185 of the OB level difference correcting unit 135 detects the average value "DM" of the signal output from the dummy pixel unit 151 during the "a" period shown in FIG. 8. The vertical pre-stage OB unit detecting unit 187 of the OB level difference correcting unit 135 detects the average value "D" of the signal output from the first region of the vertical pre-stage OB unit 155 during the "b" period shown in FIG. 8. The "D−DM" calculated using the values output from the respective detecting unit is transmitted to the correction table managing unit 191. As shown in FIG. 8, the calculated "D−DM" becomes the magnitude of the signal corresponding to the dark current generated in the vertical pre-stage OB unit. Each detecting unit holds the final output value.

Thereafter, the effective pixel unit detecting unit 189 of the OB level difference correcting unit 135 detects the average value "E" of the signal output from the effective pixel unit 153. The "E−DM" obtained by subtracting the value output from the dummy pixel unit detecting unit 185 from the value output from the effective pixel unit detecting unit 189 has a magnitude of a signal corresponding to the dark current generated in the effective pixel unit 153, as shown in FIG. 8. As apparent from FIG. 8, the "E−D=DS" obtained by subtracting the value output from the first region of the vertical pre-stage OB unit 155 from the value output from the effective pixel unit detecting unit 189 becomes the OB level difference.

The correction table managing unit 191 associates the transmitted values "D−DM" and "DS" to each other, and writes the same to the correction table as one photographing result.

The correction table can be created by performing such photographing over plural times while changing the dark current generation conditions (i.e., temperature, exposure time, gain, etc.).

When the graph shown in FIG. 6 is represented with a linear relation passing through the origin by the measurement result of plural times, the slope of the line may be recorded as the correction table instead of recording to the respective photographing result, or the respective photographing result and the slope of the line may be recorded as the correction table. If the relationship of the dark current and the OB level difference is known beforehand to be a linear relation passing through the origin as a result of various measurements, the above-described photographing may be performed only once.

The creation of the correction table may be performed only once such as in time of factory shipment, or may be executed, as needed, when a command to create the correction table is input by the user of the imaging apparatus 100.

<Regarding Adjustment Method of Black Level>

Figure 9:
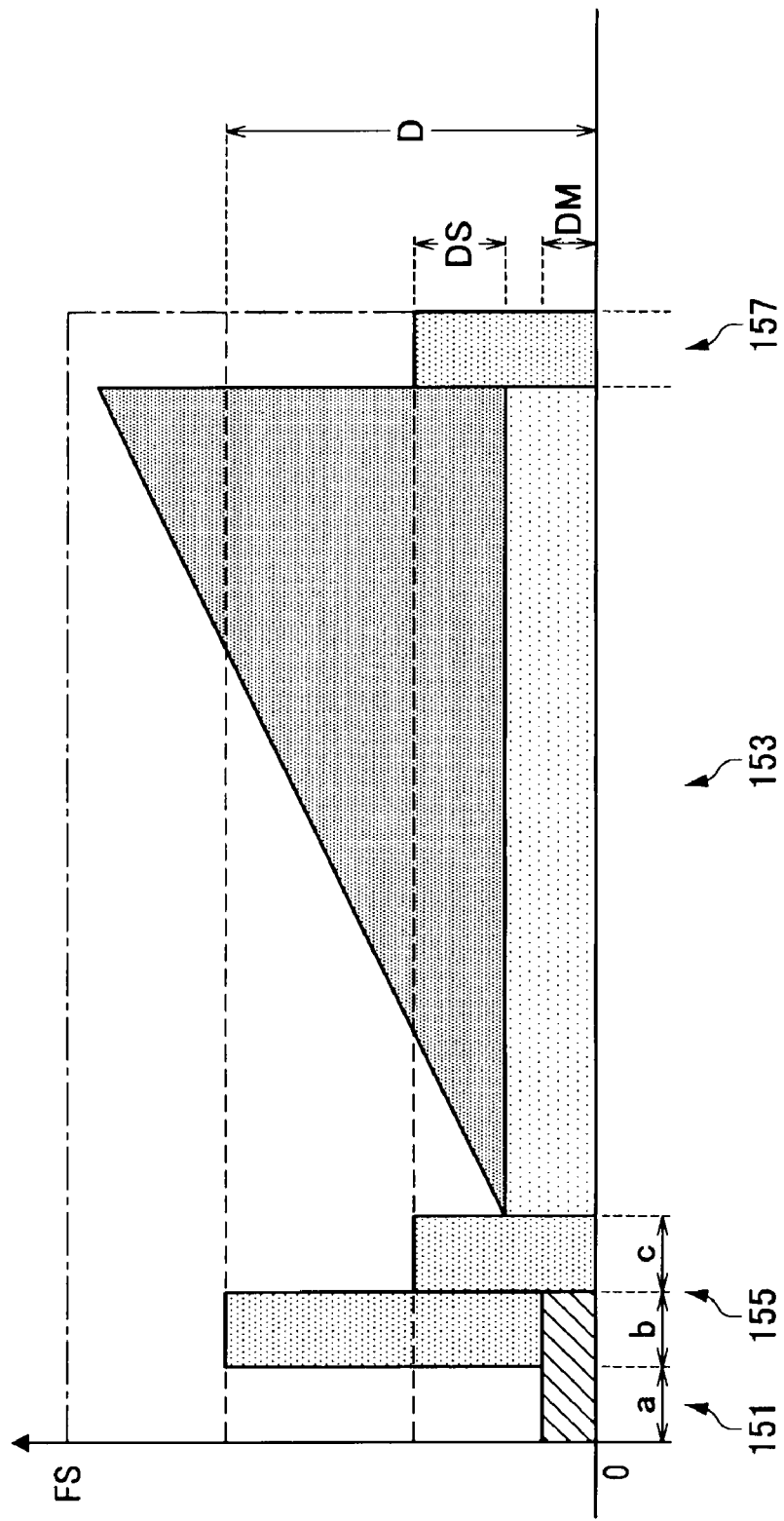
FIG. 9 is an explanatory view for describing an adjustment method of the black level performed by the imaging apparatus according to the present embodiment.

The adjustment method of the black level performed by the imaging apparatus 100 according to the present embodiment will be specifically described with reference to FIG. 9. FIG. 9 is an explanatory view for describing the adjustment method of the black level performed by the imaging apparatus according to the present embodiment.

During the normal photographing by a user, the adjustment method of the black level as described below is performed. First, the first clamp circuit unit 127 of the imaging unit 101 clamps the signal output from the dummy pixel unit 151 to the first clamp target value during the "a" period. The switch circuit unit 171 of the second clamp circuit unit 133 is set to open. The dummy pixel unit detecting unit 185 of the OB level difference correcting unit 135 detects the average value "DM" of the signal output from the dummy pixel unit 151 during the "a" period shown in FIG. 9. The vertical pre-stage OB unit detecting unit 187 of the OB level difference correcting unit 135 detects the average value "D" of the signal output from the first region of the vertical pre-stage OB unit 155 during the "b" period shown in FIG. 9. The "D−DM" calculated using the values output from the respective detecting unit is transmitted to the correction table managing unit 191.

The correction table managing unit 191 of the OB level difference correcting unit 135 calculates the magnitude "DS" (i.e., correction amount $DS_N$) of the OB level difference produced in the imaging element 125 based on the value of the transmitted "D−DM" and the correction table recorded in the storage unit 113 and the like. Specifically, the correction table managing unit 191 references the correction table to select the data $(L, DS_L)$ having a value of smaller than or equal to the transmitted "D−DM" and the data $(H, DS_H)$ having a value of greater than or equal to the "D−DM". Thereafter, the correction table managing unit 191 calculates the correction amount $DS_N$ from Equation 1 using the selected values and the value of the transmitted "D−DM". The correction table managing unit 191 transmits the calculated correction amount "$DS_N$" to the correcting unit 183.

The switch circuit unit 171 of the second clamp circuit unit 133 is in the ON state in the "c" period shown in FIG. 9, and the signal output from the second region of the vertical pre-stage OB unit 155 is clamped to the second clamp target value, as shown in FIG. 9. When the input of the signal corresponding to the "c" period to the second clamp circuit unit 133 is terminated, the switch circuit unit 171 becomes the OFF state, and the final average value in the "c" period is transmitted to the correcting unit 183 of the OB level difference correcting unit 135.

The correction execution determining unit 193 of the correcting unit 183 determines whether or not the signal transmitted from the ADC 131 is the signal output from the effective pixel unit 153. If the signal transmitted from the ADC 131 is not the signal output from the effective pixel unit 153, the correcting unit 183 does not perform the correction process of the OB level difference. If the signal transmitted from the ADC 131 becomes the signal output from the effective pixel unit 153, the correction execution determining unit 193 transmits to the offset adder 195 a notification that the signal output from the effective pixel unit 153 is reached.

The offset adder 195 uniformly subtracts the difference of the final average value in the "c" period, which it holds, and the second clamp target value from the digital signal (i.e., signal output from the effective pixel unit 153) transmitted from the ADC 131. Furthermore, the offset adder 195 uniformly adds the correction amount "$DS_N$" transmitted from the correction table managing unit 191 to the signal on which the subtraction process is terminated.

Therefore, in the adjustment method of the black level according to the present embodiment, the first region of the vertical pre-stage OB unit is not subjected to the clamping process, and detection of the dark current is performed. The clamping process of IIR integration and the like is performed on the second region of the vertical pre-stage OB unit to adjust the black level to a reference level. The influence originating from the OB level difference superimposed on the signal transmitted from the effective pixel unit 153 can be corrected by having the offset adder 195 perform the process described above. As a result, the imaging apparatus 100 can stabilize the black level and ensure the dynamic range, as shown in FIG. 9.

CONCLUSION

As described above, in the imaging apparatus according to each embodiment of the present invention, the clamping operation and the dark current detection are performed using the signal output from the imaging element and the normal ADC, and the correction amount of the OB level difference is calculated using the correction table set in advance. Thus, the OB level difference produced by the imaging element can be adjusted in one time and can be accurately corrected in real time with respect to temperature change without involving addition of external sensor such as temperature sensor and increase in circuit scale. As a result, the enhancement of yield of the imaging element arranged in the imaging apparatus and the enhancement of image quality can be achieved.

If the signal obtained from the pixel configuring the optical black unit is clamped as in the adjustment method of the black level of the related art, the black level can be stabilized and the dynamic range of the image signal can be ensured but the dark current becomes difficult to correctly detect. The imaging apparatus according to each embodiment of the present invention thus sectionalizes the vertical pre-stage OB unit to the first region and the second region, and does not perform clamping in the first region but performs clamping in the second region. Through such clamping method, the dark current can be accurately detected while ensuring the dynamic range.

The present application contains subject matter related to that disclosed in Japanese Priority Patent Application JP 2008-230302 filed in the Japan Patent Office on Sep. 8, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For instance, in the embodiment described above, a case of using the correction table described with the relationship of the signal corresponding to the dark current generated in the vertical pre-stage OB unit and the OB level difference has been described. However, the OB level difference may be corrected using the correction table described with the relationship of the signal corresponding to the dark current generated in the vertical pre-stage OB unit and the signal corresponding to the dark current generated in the effective pixel unit.

What is claimed is:

1. An imaging apparatus comprising:
   an imaging element including,
   an effective pixel unit for converting a light entered to a pixel to a signal charge and outputting as an effective pixel signal, and
   a vertical pre-stage optical black unit arranged at a pre-stage of the effective pixel unit along a vertical transfer direction, a signal obtained from a light shielded pixel being used as a reference of black level;
   a storage unit for storing a correction table described with a relationship of a signal corresponding to a dark current generated in the vertical pre-stage optical black unit and an optical black level difference which is a difference between a black level in the vertical pre-stage optical black unit and a black level of an image signal; and
   an optical black level difference correcting unit for performing a process by sectionalizing the vertical pre-stage optical black unit to a first region positioned on a side opposite to the effective pixel unit along the vertical transfer direction and a second region positioned on the effective pixel unit side and read out after the first region, and calculating a correction amount for correcting the optical black level difference using a signal corresponding to the dark current obtained from the first region and the correction table.

2. The imaging apparatus according to claim 1, wherein the imaging element further includes a dummy pixel unit arranged at a pre-stage along the vertical transfer direction of the vertical pre-stage optical black unit, and
   the optical black level difference correcting unit references the correction table based on a difference between a magnitude of the signal corresponding to the dark current obtained from the first region and a magnitude of the signal corresponding to the dark current obtained from the dummy pixel unit, and calculates the correction amount of the optical black level difference corresponding to such difference.

3. The imaging apparatus according to claim 2, wherein the optical black level difference correcting unit calculates the correction amount through linear interpolation based on the magnitude of the signal corresponding to the dark current and the magnitude of the optical black level difference described in the correction table, and the difference between the magnitude of the signal corresponding to the dark current obtained from the first region and the magnitude of the signal corresponding to the dark current obtained from the dummy pixel unit.

4. The imaging apparatus according to claim 2, further comprising a clamp circuit unit for clamping the vertical pre-stage optical black unit, wherein
   the clamp circuit unit does not perform clamping in the first region and performs clamping to a predetermined level in the second region.

5. An adjustment method of a black level comprising the steps of:
   acquiring, in an imaging element including an effective pixel unit for converting a light entered to a pixel to a signal charge and outputting as an effective pixel signal, and a vertical pre-stage optical black unit arranged at a pre-stage of the effective pixel unit along a vertical transfer direction, a signal obtained from a light shielded pixel being used as a reference of black level, a signal corresponding to a dark current from a first region positioned on a side opposite to the effective pixel unit along the vertical transfer direction of a vertical pre-stage optical black unit; and
   calculating a magnitude of an optical black level difference to be corrected using a correction table described with a relationship of a signal corresponding to a dark current generated in the vertical pre-stage optical black unit and the optical black level difference which is a difference between a black level in the vertical pre-stage optical black unit and a black level of an image signal, and a signal corresponding to the dark current obtained from the first region.

6. A program for causing a computer to realize an optical black level difference correcting function, the computer controlling an imaging element including an effective pixel unit for converting a light entered to a pixel to a signal charge and outputting as an effective pixel signal, and a vertical pre-stage optical black unit arranged at a pre-stage of the effective pixel unit along a vertical transfer direction, a signal obtained from a light shielded pixel being used as a reference of black level; the optical black level difference correcting function comprising:

performing a process by sectionalizing the vertical pre-stage optical black unit to a first region positioned on a side opposite to the effective pixel unit along the vertical transfer direction and a second region positioned on the effective pixel unit side and read out after the first region, and calculating a correction amount for correcting the optical black level difference using a signal corresponding to a dark current obtained from the first region and a correction table described with a relationship of a signal corresponding to the dark current generated in the vertical pre-stage optical black unit and an optical black level difference which is a difference between a black level in the vertical pre-stage optical black unit and a black level of an image signal.

* * * * *